United States Patent
Auxier

[19]

[11] Patent Number: 5,953,790
[45] Date of Patent: Sep. 21, 1999

[54] SANITARY HANDLE COVER SYSTEM FOR SHOPPING CARTS

[76] Inventor: Marilyn S. Auxier, 5240 SW. 116 Hwy., Dekalb, Mo. 64440

[21] Appl. No.: 09/036,655

[22] Filed: Mar. 6, 1998

[51] Int. Cl.[6] .................................................. A47B 95/02
[52] U.S. Cl. ............................ 16/116 R; 16/436; 16/904
[58] Field of Search ............................ 16/114 R, 111 R, 16/116 R, 116 A, 125, 110 R; 38/95; 2/20; 280/33.992, 33.993

[56] References Cited

U.S. PATENT DOCUMENTS

| | | | |
|---|---|---|---|
| 2,274,605 | 2/1942 | Hoffmeister | 16/110 R |
| 3,866,649 | 2/1975 | Bringmann | 150/52 R |
| 4,262,385 | 4/1981 | Norman | 16/114 R |
| 4,805,937 | 2/1989 | Boucher et al. | 280/33.992 |
| 5,142,736 | 9/1992 | Kuehn et al. | 16/111 R |
| 5,215,319 | 6/1993 | Farris | 280/33.992 |
| 5,364,148 | 11/1994 | Bartocci | 294/171 |
| 5,427,392 | 6/1995 | Duer | 280/33.992 |
| 5,429,377 | 7/1995 | Duer | 280/33.992 |
| 5,511,445 | 4/1996 | Hildebrandt | 16/110 R |
| 5,678,888 | 10/1997 | Sowell et al. | 297/256.17 |
| 5,722,672 | 3/1998 | Frederick | 280/33.992 |

*Primary Examiner*—Chuck Y. Mah
*Attorney, Agent, or Firm*—Joseph N. Breaux

[57] ABSTRACT

A sanitary handle cover system for shopping carts that includes a dual layer exterior shield and an interior foam cushion assembly that are each positioned over the existing handle of a shopping card to provide multiple barrier layers between the user and the existing shopping cart handle. The dual layer exterior shield includes a fluid impermeable layer and a fluid absorbent layer. The exterior shield preferably includes an exterior fabric layer such as terry cloth and an fluid impermeable layer such as a flexible plastic film that are stitched together and securable about the interior foam cushion assembly by a pair of securing straps and snaps. The foam cushion assembly preferably includes a foam tube that is split longitudinally to provide an opening for insertion of the shopping cart handle and further preferably includes an elongated closed cell foam exterior tube cemented over an elongated open cell foam interior tube and the interior and exterior tubes have in registration longitudinal splits along the sides thereof.

1 Claim, 1 Drawing Sheet

SANITARY HANDLE COVER SYSTEM FOR SHOPPING CARTS

TECHNICAL FIELD

The present invention relates to sanitary covers and more particularly to a sanitary handle cover system for the handle of a shopping cart that includes a dual layer exterior shield and an interior foam cushion assembly that are each positioned over the existing handle of a shopping card to provide multiple barrier layers between the user and the existing shopping cart handle.

BACKGROUND ART

The handles of shopping carts can become contaminated with a variety of unhygienic materials such as fecal matter, spit, urine, blood and disease causing bacteria and antigens. It would be a benefit, therefore to have a sanitary cover system for covering the existing handle of a shopping cart to provide a clean sanitary gripping and pushing surface for a user to move the shopping cart while shopping. Because the contaminants can be carried by liquids, it would be a further benefit to have a sanitary cover system that included at least one fluid impermeable barrier between the existing handle and the hand of the user.

It would also be a benefit to have a sanitary cover system for shopping cart handles that included a disinfectant mechanism to kill disease transmitting bacteria and multiple fluid impermeable barriers between the shopping cart handle and the hand of the user. Because shopping is a regular occurrence, it would of course also be a benefit to have a sanitary handle cover system for shopping carts that could be sanitized by laundering between uses.

GENERAL SUMMARY DISCUSSION OF INVENTION

It is thus an object of the invention to provide a sanitary handle cover system for shopping carts.

It is a further object of the invention to provide a sanitary handle cover system for shopping carts that includes at least one fluid impermeable barrier that is positionable between the existing handle and the hand of the user.

It is a still further object of the invention to provide a sanitary handle cover system for shopping carts that includes a disinfectant mechanism to kill disease transmitting bacteria and multiple fluid impermeable barriers between the shopping cart handle and the hand of the user.

It is a still further object of the invention to provide a sanitary handle cover system for shopping carts that is launderable between uses.

It is a still further object of the invention to provide a sanitary handle cover system for shopping carts that accomplishes some or all of the above objects in combination.

Accordingly, a sanitary handle cover system for shopping carts is provided. The sanitary handle cover system for shopping carts includes a dual layer exterior shield and an interior foam cushion assembly that are each positioned over the existing handle of a shopping card to provide multiple barrier layers between the user and the existing shopping cart handle, the dual layer exterior shield including a fluid impermeable layer and a fluid absorbent layer. In a preferred embodiment the exterior shield includes an exterior fabric layer such as terry cloth and an fluid impermeable layer such as a flexible plastic film that are stitched together and securable about the interior foam cushion assembly by a pair of securing straps and snaps. In another preferred embodiment the foam cushion assembly includes a foam tube that is split longitudinally to provide an opening for insertion of the shopping cart handle. In still another embodiment, the exterior shield includes a removal pull tab. In yet another preferred embodiment the foam cushion assembly includes an elongated closed cell foam exterior tube cemented over an elongated open cell foam interior tube and the interior and exterior tubes have in registration longitudinal splits along the sides thereof. The term "closed cell foam" is used herein to mean fluid impermeable foam material. The term "open cell foam" is used herein to mean fluid absorbing foam material. When this embodiment is used, the open cell foam interior tube can be sprayed or soaked with a disinfectant such as alcohol prior to placing the foam cushion assembly over the shopping cart handle.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
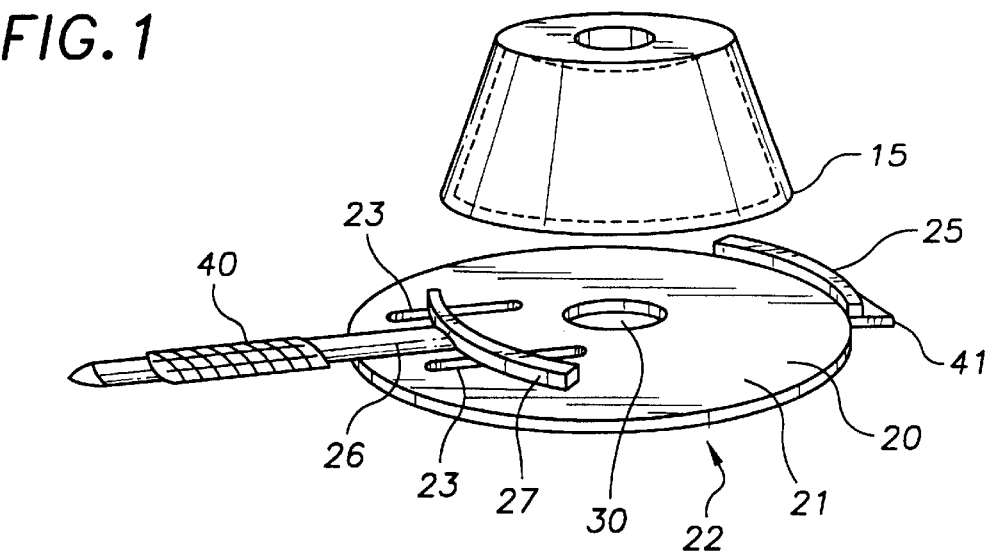
FIG. 1 is a perspective view of an exemplary embodiment of the sanitary handle cover system for shopping carts showing the dual layer exterior shield and the interior foam cushion assembly.

FIG. 1 shows an exemplary embodiment of the sanitary handle cover system for shopping carts of the present invention generally designated by the numeral 10. Sanitary handle cover system 10 includes a dual layer exterior shield, generally designated 12, and an interior foam cushion assembly, generally designated 14.

Figure 2:
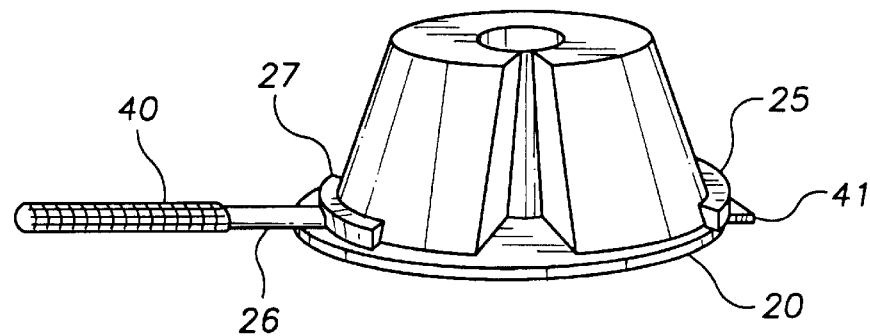
FIG. 2 is a shows the foam cushion assembly of FIG. 1 in isolation showing the elongated closed cell foam exterior tube cemented over the elongated open cell foam interior tube and the in registration longitudinal splits along the sides of the interior and exterior tubes.

Referring now to FIG. 2, in this embodiment foam cushion assembly 14 includes an elongated closed cell foam exterior tube 16 that has been cemented over an elongated open cell foam interior tube 18. Closed cell foam exterior tube 16 and open cell foam interior tube 18 have in registration longitudinal splits 20 along the sides thereof to allow insertion of a shopping cart handle, (not shown) therethrough into the handle receiving cavity 22 of open cell foam interior tube 18.

Figure 3:
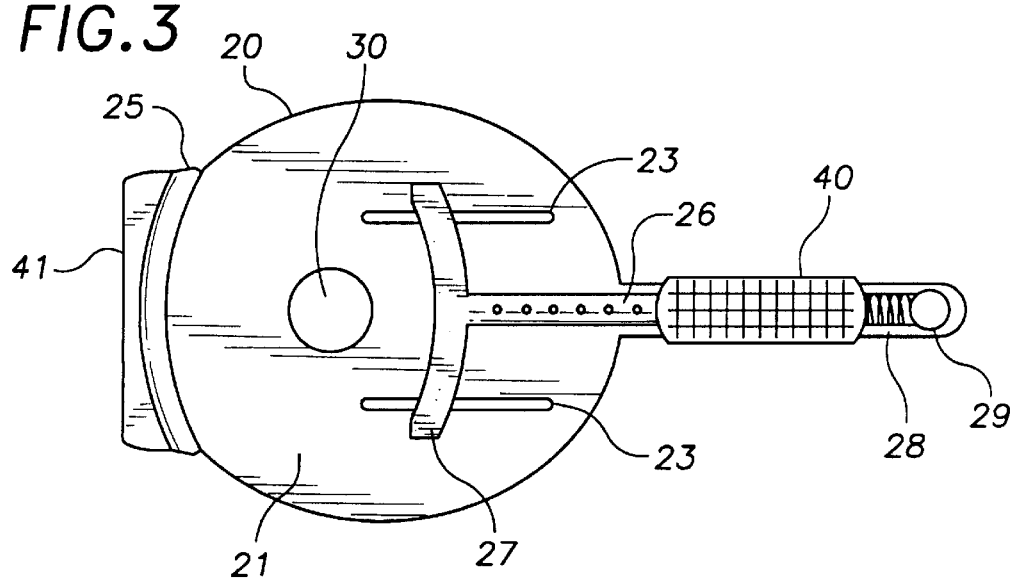
FIG. 3 is a perspective view showing the dual layer exterior shield in isolation showing the fluid impermeable inner plastic layer stitched to the exterior terry cloth layer, the two securing straps, the two securing snaps, and the removal pull tab.
Figure 1:
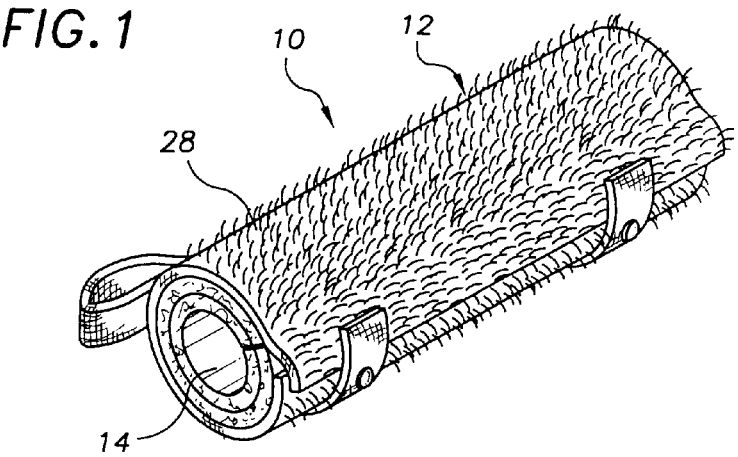
Figure 2:
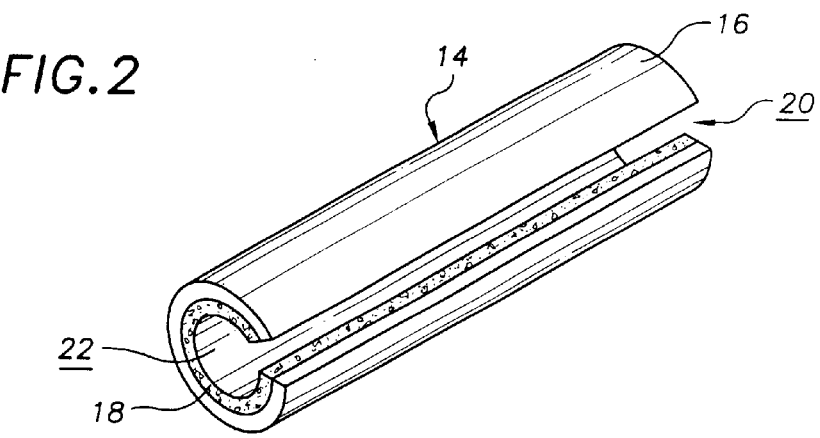
Figure 3:
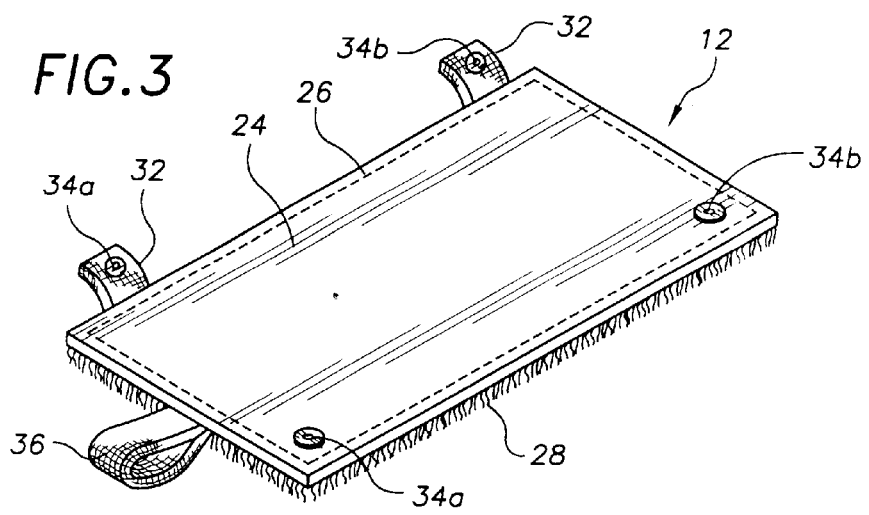

With reference now to FIG. 3, dual layer exterior shield 12 is substantially rectangular in shape and includes a fluid impermeable inner plastic layer 24 that is stitched with perimeter stitches 26 to an exterior facing terry cloth fabric layer 28 (see also FIG. 1); two securing straps 32; two securing snap assemblies 34a,34b; and a loop shaped removal pull tab 36.

With general reference to FIGS. 1–3, in use, sanitary handle cover system 10 is used by spraying a disinfectant spray into handle receiving cavity 22 prior to positioning foam cushion assembly 14 over the shopping cart handle.

Once foam cushion assembly 14 is in place, the fluid impermeable inner plastic layer 24 of dual layer exterior shield 12 is positioned against and about exterior tube 16 and dual layer exterior shield 12 is secured in place with securing straps 32 and securing snap assemblies 34a,34b such that terry cloth fabric layer 28 is facing outwardly. After use, dual layer exterior shield 12 is removed by grasping and pulling on loop shaped removal pull tab 36. Foam cushion assembly 12 is then removed. If desired, dual layer exterior shield 12 and foam cushion assembly 12 can be sanitized by laundering between uses.

It can be seen from the preceding description that a sanitary handle cover system for shopping carts has been provided that includes at least one fluid impermeable barrier that is positionable between the existing handle and the hand of the user; that includes a disinfectant mechanism to kill disease transmitting bacteria and multiple fluid impermeable barriers between the shopping cart handle and the hand of the user; and that is launderable between uses.

It is noted that the embodiment of the sanitary handle cover system for shopping carts described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A sanitary handle cover system for shopping carts comprising:

a dual layer exterior shield including a fluid impermeable layer and a fluid absorbent layer; and an interior foam cushion assembly including an open celled foam interior tube and an elongated closed cell foam exterior tube cemented over the open celled foam interior tube, said interior and exterior tubes each being split longitudinally along a side thereof; said splits being in registration to provide an insertion opening into a handle receiving cavity provided within said interior tube, said open celled foam interior tube having a quantity of disinfectant absorbed therein;

said dual layer exterior shield being positioned against and about said exterior tube.

* * * * *

UNITED STATES PATENT AND TRADEMARK OFFICE
CERTIFICATE OF CORRECTION

PATENT NO. : 5,953,790  
DATED : September 21, 1999  
INVENTOR(S) : Marilyn S. Auxier Page 1 of 1

It is certified that error appears in the above-identified patent and that said Letters Patent is hereby corrected as shown below:

Cancel drawing Figures 1-3 and replace them wiht correct drawing Figures 1-3 attached hereto.

Signed and Sealed this

Twenty-ninth Day of January, 2002

Attest:

Attesting Officer

JAMES E. ROGAN  
Director of the United States Patent and Trademark Office

UNITED STATES PATENT AND TRADEMARK OFFICE
CERTIFICATE OF CORRECTION

PATENT NO. : 5,953,790
APPLICATION NO. : 09/036655
DATED : September 21, 1999
INVENTOR(S) : Marilyn S. Auxier It is certified that error appears in the above-identified patent and that said Letters Patent is hereby corrected as shown below:

Cancel drawing Figures 1-3 and replace them with correct drawing Figures 1-3 attached hereto.

This certificate supersedes Certificate of Correction issued January 29, 2002.

Signed and Sealed this

Twenty-second Day of August, 2006

JON W. DUDAS
*Director of the United States Patent and Trademark Office*